United States Patent
Lee

(10) Patent No.: US 7,218,376 B2
(45) Date of Patent: May 15, 2007

(54) ADAPTER FOR THREE-DIMENSIONAL MOVING IMAGE PHOTOGRAPHING DEVICE

(76) Inventor: Young Hwa Lee, 101 Dongah Palace Villa, 623-3 Yoksam-dong, Seoul (KR) 135-050

( * ) Notice: Subject to any disclaimer, the term of this patent is extended or adjusted under 35 U.S.C. 154(b) by 262 days.

(21) Appl. No.: 10/516,634

(22) PCT Filed: May 30, 2003

(86) PCT No.: PCT/KR03/01064

§ 371 (c)(1),
(2), (4) Date: Nov. 30, 2004

(87) PCT Pub. No.: WO03/103276

PCT Pub. Date: Dec. 11, 2003

(65) Prior Publication Data

US 2005/0175334 A1 Aug. 11, 2005

(30) Foreign Application Priority Data

Jun. 3, 2002 (KR) ...................... 10-2002-0031117

(51) Int. Cl.
*G03B 35/00* (2006.01)
(52) U.S. Cl. ........................ 352/57; 396/324
(58) Field of Classification Search ............ 352/57–65, 352/205, 208; 396/322, 323, 324, 327, 333
See application file for complete search history.

(56) References Cited

U.S. PATENT DOCUMENTS

| | | | | |
|---|---|---|---|---|
| 3,551,036 A | * | 12/1970 | Bielusici | ...................... 352/60 |
| 4,295,153 A | * | 10/1981 | Gibson | ......................... 348/49 |
| 6,414,791 B1 | * | 7/2002 | Sugawara | .................... 359/497 |
| 7,061,532 B2 | * | 6/2006 | Silverstein | ................... 348/335 |
| 2001/0019450 A1 | * | 9/2001 | Ogino | .......................... 359/462 |
| 2002/0009300 A1 | * | 1/2002 | Fujiwara | ...................... 396/324 |

FOREIGN PATENT DOCUMENTS

| | | |
|---|---|---|
| JP | 62-098895 | 5/1987 |
| JP | 2002-152779 | 5/2002 |
| KR | 2003-0023786 | 3/2003 |

* cited by examiner

*Primary Examiner*—Rodney Fuller
(74) *Attorney, Agent, or Firm*—Merchant & Gould P.C.

(57) ABSTRACT

An adapter for a three-dimensional moving image photographing device includes a lens unit and a half-reflecting mirror. The lens unit comprises entrance and exit lens parts, each including release lenses disposed in the middle of the lens unit. The entrance and exit lens parts are ranged symmetrically to each other, The lens unit has an entrance pupil point formed outside the entrance lens part. The half-reflecting mirror is disposed on a light axis of a photographing lens between a first total reflecting minor and the lens unit while being inclined at a prescribed angle relative to the light axis for reflecting a moving image having been introduced along a second light axis and reflected by a second total reflecting minor, and transmitting a moving image having been introduced along a third light axis and reflected by a third total reflecting mirror and the first total reflecting mirror.

7 Claims, 6 Drawing Sheets

ADAPTER FOR THREE-DIMENSIONAL MOVING IMAGE PHOTOGRAPHING DEVICE

TECHNICAL FIELD

The present invention relates to an adapter for a three-dimensional moving image photographing device, and more particularly to an adapter for a three-dimensional moving image photographing device comprising an adapter housing for alternately passing right and left moving images of an object therethrough, and a lens unit having an entrance pupil point formed outside the lens unit, whereby it is possible to photograph moving images with wide picture angles without increasing the size of the adapter housing, and to prevent occurrence of any distortion in the resulting moving images comprised of the integrated right and left moving images of the object.

BACKGROUND ART

As well known to those skilled in the art, a conventional three-dimensional moving image photographing device for video cameras uses two video cameras to photograph right and left moving images of an object. The right moving image of the object is photographed using one of the video cameras arranged at the right side of the object, and the left moving image of the object is photographed using the other video camera arranged at the left side of the object. The photographed right and left moving images of the object are finally integrated. The conventional three dimensional moving image photographing device has a disadvantage in that it essentially requires two cameras each having various accessories, and in that it is difficult and takes much time to integrate the moving images.

An adapter for a three-dimensional moving image photographing device has been proposed in order to eliminate the aforesaid disadvantage, which has been invented by the inventor of the present application and is disclosed in Korean Unexamined Patent Publication No. 2000-24767. The disclosed adapter for the three-dimensional moving image photographing device comprises an adapter housing 18 having two liquid crystal shutter units 60 and 70 mounted therein for alternately photographing right and left moving images of an object 100, as shown in FIG. 5. A photographing lens 12 is arranged in between a second light axis A2, along which the right moving image of the object 100 passes, and a third light axis A3, along which the left moving image of the object 100 passes. In the adapter housing 18 is disposed a second total reflecting mirror 42, which is inclined at an angle of 45 degrees relative to the second light axis A2. Consequently, the moving image of the object 100 having passed through a concave lens 37 along the second light axis A2 is totally reflected by the second total reflecting mirror 42. In the adapter housing 100 is also disposed a third total reflecting mirror 43, which is inclined at an angle of 45 degrees relative to the third light axis A3. Consequently, the moving image of the object 100 having passed through another concave lens 37 along the second light axis A3 is totally reflected by the third total reflecting mirror 43. On a light axis A1 of the photographing lens 12 are disposed a half-reflecting minor 80 and a first total reflecting mirror 41. With the above-stated construction, the right moving image reflected by the second total reflecting mirror 42 is also reflected by the first total reflecting mirror 41 disposed on the light axis A1 of the photographing lens 12, and then enters the photographing lens 12. Similarly, the left moving image reflected by the third total reflecting mirror 43 is also reflected by the half-reflecting mirror 80 disposed on the light axis A1 of the photographing lens 12, and then enters the photographing lens 12. The liquid crystal shutter unit 60 is interposed between the half-reflecting minor 80 and the second total reflecting mirror 42 for allowing the moving image having been introduced along the second light axis A2 to enter the photographing lens 12 or stopping the moving image having been introduced along the second light axis A2 from entering the photographing lens 12. Similarly, the liquid crystal shutter unit 70 is interposed between the half-reflecting mirror 80 and the third total reflecting mirror 43 for allowing the moving image having been introduced along the third light axis A3 to enter the photographing lens 12 or stopping the moving image having been introduced along the third light axis A3 from entering the photographing lens 12. Consequently, while the fight moving image of the object 100 having been introduced along the second light axis A2 enters the photographing lens 12, the liquid crystal shutter unit 70 is closed off so that the left moving image of the object 100 having been introduced along the third light axis A3 does not enter the photographing lens 12. On the other hand, while the left moving image of the object 100 having been introduced along the third light axis A3 enters the photographing lens 12, the liquid crystal shutter unit 60 is closed off so that the right moving image of the object 100 having been introduced along the second light axis A2 does not enter the photographing lens 12. In conclusion, one of the right and left moving images of the object 100 is photographed while the other is not photographed in order to obtain the three-dimensional moving images of the object 100.

In the aforesaid conventional adapter for the three-dimensional moving image photographing device, however, an entrance pupil point E is formed inside the three-dimensional moving image photographing device, as shown in FIG. 6. For this reason, the second total reflecting mirror 42 and the third total reflecting mirror 43 must be arranged in such a manner that they are spaced apart from the light axis A1 of the photographing lens 12 in the right and left directions, respectively, when a wide moving image having a wider picture angle, for example, a picture angle of 52 degrees, is to be photographed. Furthermore, it is necessary to greatly increase the sizes of the total reflecting mirrors, which causes the adapter housing having the total reflecting mirrors mounted therein to be increased in size.

Besides, in the conventional adapter the distance between the light axis A1 of the photographing lens 12 and the second light axis A2 is not equal the distance between the light axis A1 of the photographing lens 12 and the third light axis A3, as shown FIG. 6. The result is that the right and left moving images of the object 100 are different from each other, whereby distortion occurs in the resulting moving images comprised of the integrated right and left moving images of the object 100.

DISCLOSURE OF THE INVENTION

Therefore, the present invention has been made in view of the above problems, and it is an object of the present invention to provide an adapter for a three-dimensional moving image photographing device comprising a lens unit interposed between a photographing lens and an adapter housing for alternately passing right and left moving images of an object therethrough, wherein the lens unit has an entrance pupil point formed outside the lens unit, the lens unit has a magnification of 1:1, and the lens unit comprises a plurality of symmetrically arranged lenses for reversing the moving images, whereby it is possible to photograph moving images with wide picture angles without increasing the size of the adapter housing, and to prevent occurrence of any distortion in the resulting moving images comprised of the integrated right and left moving images of the object.

In accordance with the present invention, the above and other objects can be accomplished by the provision of an adapter for a three-dimensional moving image photographing device having a photographing lens and an output terminal, comprising: a lens unit comprising an entrance lens part and an exit lens part, each of the entrance and exit lens parts including release lenses, the release lenses of the entrance and exit lens parts being disposed in the middle of the lens unit, the entrance and exit lens parts being arranged symmetrically to each other in a line so that a moving image passing through the entrance lens part is reversed at a magnification of 1:1 to leave the exit lens part, the lens unit being disposed in front of the photographing lens and having an entrance pupil point of the entrance lens part formed outside the entrance lens part; and an adapter housing disposed in front of the lens unit for alternately passing right and left moving images of an object having been introduced along second and third light axes therethrough so that the right and left moving images of the object enter the lens unit along a light axis of the photographing lens, the second and third light axes being spaced at prescribed distances from the light axis of the photographing lens in the right and left directions, respectively, whereby it is possible to photograph moving images with wide picture angles without increasing the size of the adapter housing, and to prevent occurrence of any distortion in the resulting moving images comprised of the integrated right and left moving images of the object.

Preferably, the adapter housing of the present invention comprises: a first prism having an inclined surface on the light axis of the photographing lens; a second prism disposed between the first prism and the lens unit for transmitting the moving image reflected by the first prism; a third prism having an inclined surface on the second light axis for reflecting the moving image having been introduced along the second light axis toward the light axis of the photographing lens; and a total reflecting mirror disposed on the third light axis for reflecting the moving image having been introduced along the third light axis to the first prism, wherein the second and third prisms are combined with each other, and the second and third prisms have an interface provided therebetween on the light axis of the photographing lens, the interface being inclined at a prescribed angle to the light axis of the photographing lens and coated with a half reflection substance, whereby the right moving image having been introduced along the second light axis and reflected by the third prism is reflected and the left moving image having been introduced along the third light axis and reflected by the total reflecting mirror and the first prism is transmitted.

Preferably, the adapter housing of the present invention comprises: a first total reflecting mirror disposed on the light axis of the photographing lens, the first total reflecting mirror being inclined at a prescribed angle relative to the light axis of the photographing lens; a second total reflecting mirror disposed on the second light axis while being inclined at a prescribed angle relative to the second light axis for reflecting the moving image having been introduced along the second light axis toward the light axis of the photographing lens; a third total reflecting minor disposed on the third light axis while being inclined at a prescribed angle relative to the third light axis for reflecting the moving image having been introduced along the third light axis toward the light axis of the photographing lens; and a half-reflecting mirror disposed on the light axis of the photographing lens between the first total reflecting mirror and the lens unit while being inclined at a prescribed angle relative to the light axis of the photographing lens for reflecting the moving image having been introduced along the second light axis and reflected by the second total reflecting mirror, and transmitting the moving image having been introduced along the third light axis and reflected by the third and first total reflecting mirrors.

Preferably, the adapter of the three-dimensional moving image photographing device according to the present invention further comprises a shutter arranged over the light axis of the photographing lens and the second light axis in such a manner that the shutter is disposed between the first prism and the second prism on the light axis of the photographing lens and also disposed in front of the third prism on the second light axis, wherein the shutter has a circular section, a half of the circular section being transparent and the other half of the circular section being opaque, for alternately passing the right and left moving images of the object having been introduced along the second and third fight axes therethrough.

Alternatively, the shutter may be arranged over the light axis of the photographing lens and the second light axis in such a manner that the shutter is disposed between the half-reflecting mirror and the first total reflecting mirror on the light axis of the photographing lens and also disposed in front of the second total reflecting mirror on the second light axis, wherein the shutter has a circular section, a half of the circular section being transparent and the other half of the circular section being opaque, for alternately passing the right and left moving images of the object having been introduced along the second and third light axes therethrough.

Preferably, the distance between the light axis of the photographing lens and the second light axis is equal to the distance between the light axis of the photographing lens and the third light axis to prevent occurrence of any distortion in the resulting moving images comprised of the integrated right and left moving images of the object.

The entrance lens part and exit lens part of the lens unit may be parallel with each other while being spaced apart from each other, and each lens part has a Porro-prism, which is formed in the shape of right-angled isosceles triangles and arranged opposite to each other so that the moving image is reversed, whereby the length of the lens unit is reduced.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
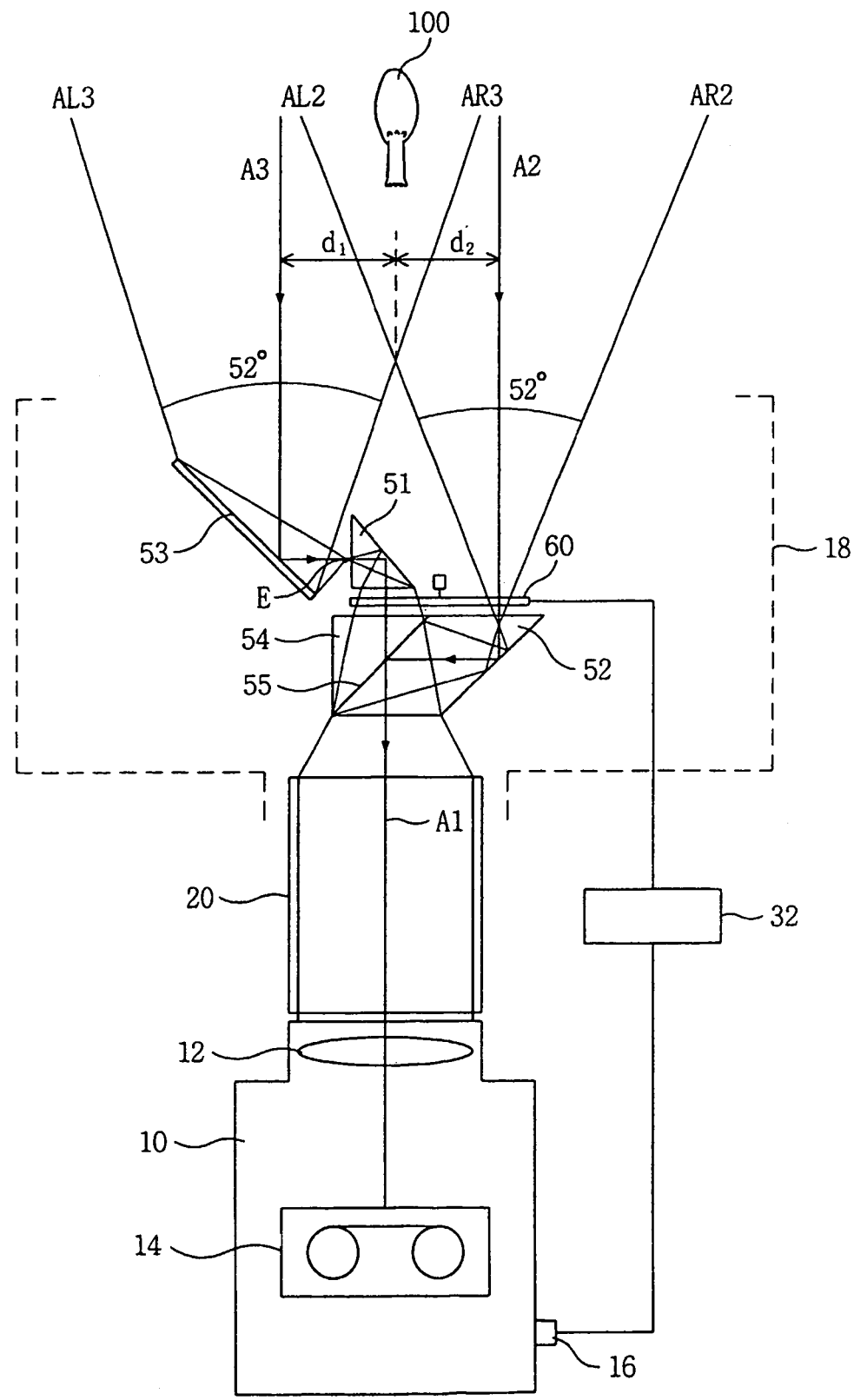
FIG. 1 is a schematic diagram of an adapter for a three-dimensional moving image photographing device according to a first preferred embodiment of the present invention.

Now, preferred embodiments of the present invention will be described in detail with reference to the annexed drawings. In the drawings, the same or similar elements are denoted by the same reference numerals even though they are depicted in different drawings.

Embodiment 1

FIG. 1 is a schematic diagram of an adapter for a three-dimensional moving image photographing device according to a first preferred embodiment of the present invention.

As shown in FIG. 1, the adapter for the three-dimensional moving image photographing device according to the present invention comprises an adapter housing 18, and a lens unit 20 interposed between the adapter housing 18 and a photographing lens 12.

The lens unit 20 is mounted to the front part of the photographing lens 12, and the adapter housing 18 is mounted to the front part of the lens unit 20. Inside the adapter housing 18 is disposed a first prism 51 having an inclined surface on a light axis A1 of the photographing lens 12 in front of the photographing lens 12. Between the first prism 51 and the lens unit 20 are disposed a second prism 54 and a third prism 52. The second and third prisms 54 and 52 are combined with each other. Between the combined second and third prisms 54 and 52 is provided an interface 55, which is inclined at a prescribed angle to the light axis A1 of the photographing lens 12. The interface 55 is coated with a dielectric substance having a reflectivity of 50% and a transmissivity of 50% so that the interface 55 not only transmits the moving image introduced in one direction but also reflects the moving image introduced in the other direction. In this embodiment, the right and left moving images having different introduction paths are transmitted or reflected, respectively.

The third prism 52 is formed in such a manner that it is arranged on the second light axis A2 as well as the light axis A1 of the photographing lens 12 and it has an inclined surface formed with a prescribed angle relative to the second light axis A2. The right moving image of the object 100 is introduced along the second light axis A2. The introduced right moving image of the object 100 is transmitted into the third prism 52, and then reflected by the inclined surface of the third prism 52. The reflected right moving image of the object 100 is forwarded to the interface 55, by which the reflected right moving image of the object 100 is reflected again and then enters the photographing lens 12 via the lens unit 20 along the light axis A1 of the photographing lens 12.

On the third light axis A3 is disposed a total reflecting mirror 53, which is inclined at a prescribed angle relative to the third light axis A3. The total reflecting mirror 53 serves to reflect the left moving image of the object 100 introduced along the third light axis A3 to the first prism 51. The left moving image of the object 100 reflected by the total reflecting mirror 53 is transmitted into the first prism 51, and then reflected by the inclined surface of the first prism 51. The reflected left moving image of the object 100 is transmitted into the second prism 54 along the light axis A1 of the photographing lens 12, and passes through the third prism 52 via the interface 55. Afterward, the left moving image of the object 100 passes through the lens unit 20 to enter the photographing lens 12.

Figure 3:
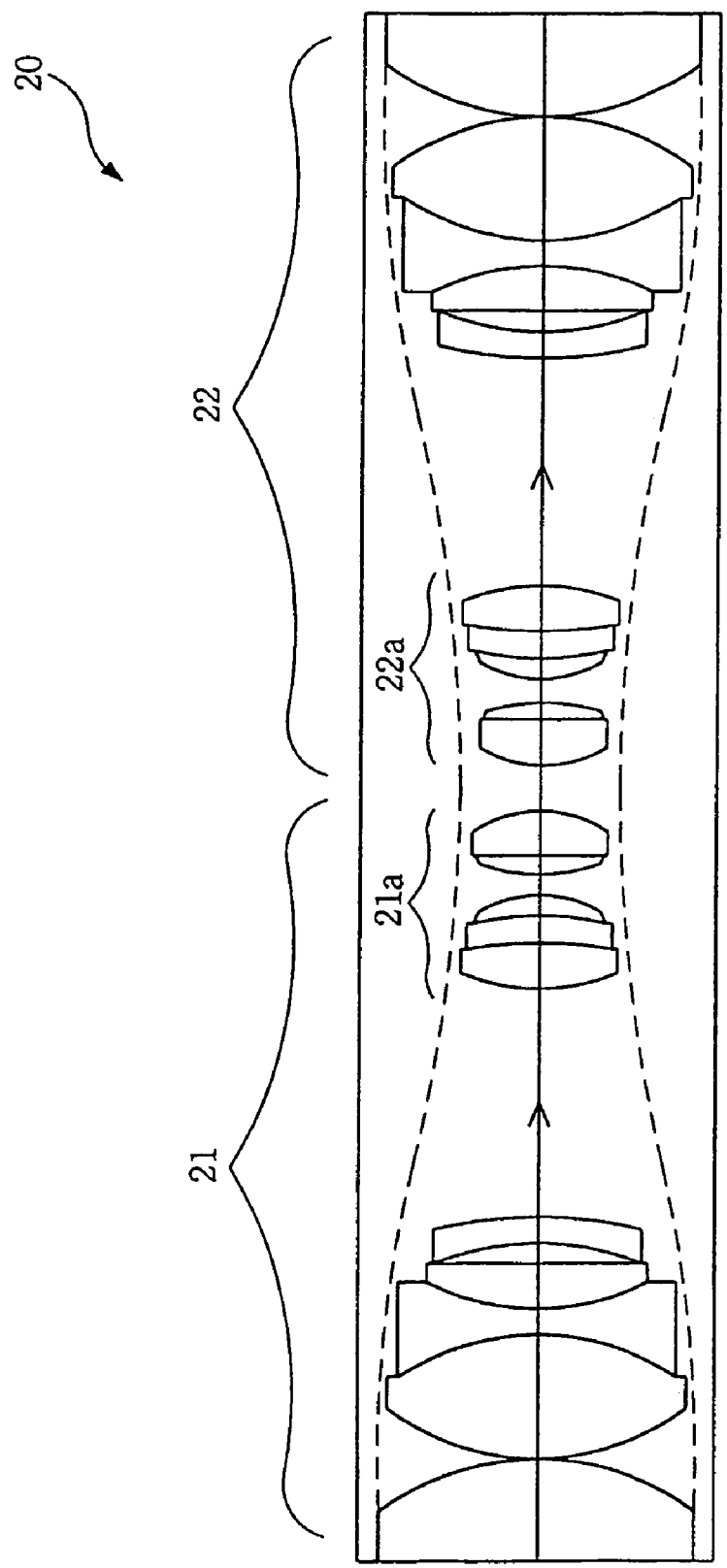
FIG. 3 is an enlarged view of a lens unit according to a preferred embodiment of the present invention, which is applicable to the adapter for the three dimensional moving image photographing device according to the present invention.
Figure 4:
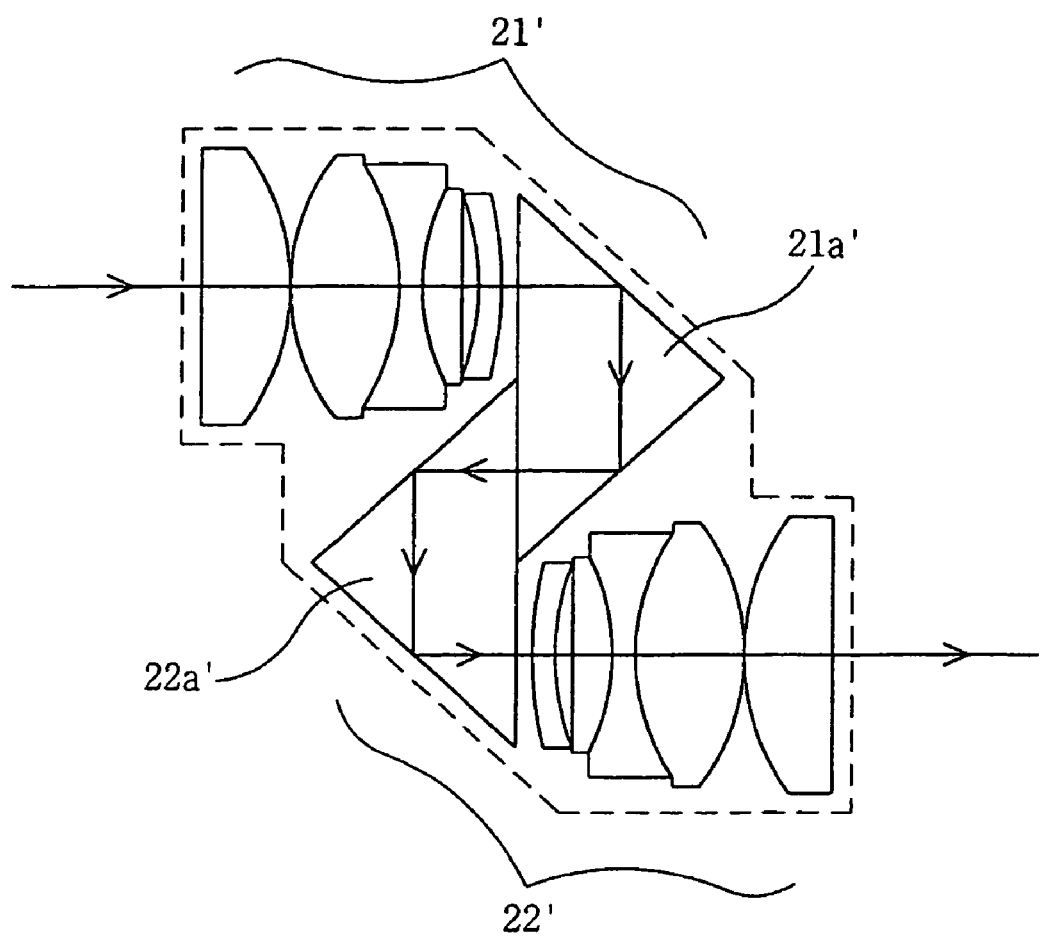
FIG. 4 is an enlarged view of a lens unit according to another preferred embodiment of the present invention, which is applicable to the adapter for the three-dimensional moving image photographing device according to the present invention.
Figure 5:
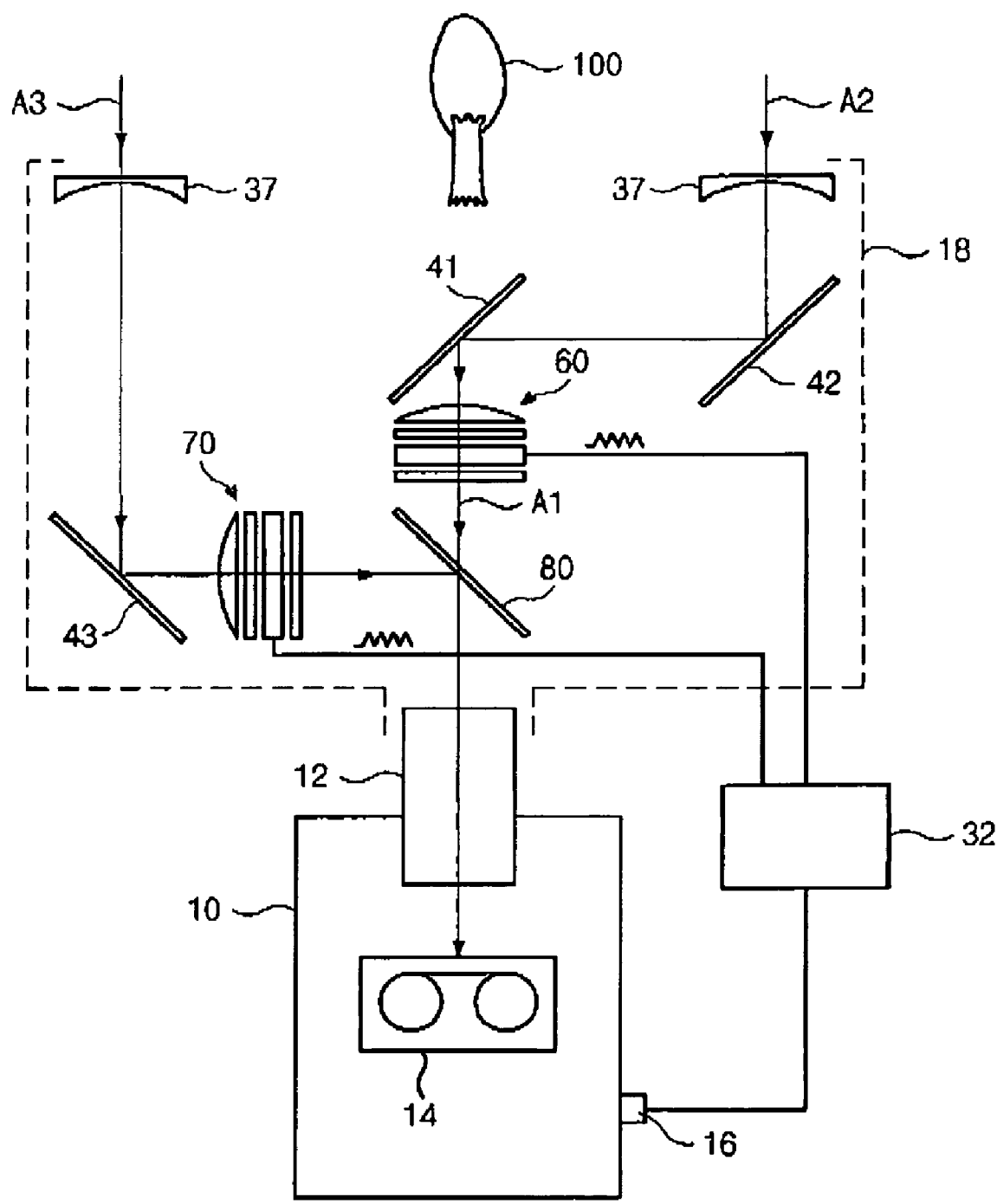
FIG. 5 is a schematic diagram of an adapter for a three-dimensional moving image photographing device according to a conventional art.
Figure 6:
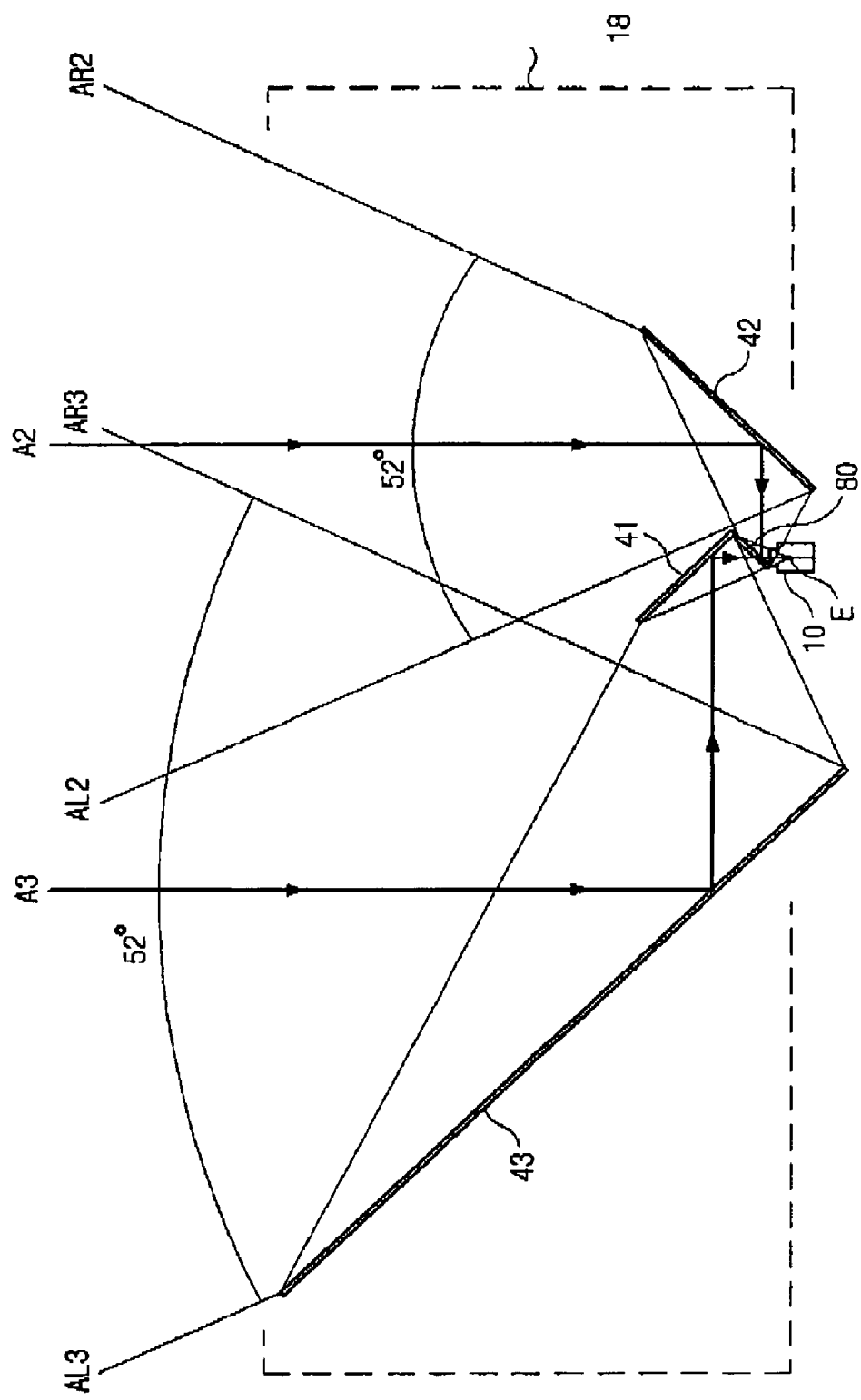
FIG. 6 is an enlarged view of the conventional adapter for the three-dimensional moving image photographing device, showing components of the adapter, which are arranged to photograph wide moving images.

FIG. 3 is an enlarged view of a lens unit according to a preferred embodiment of the present invention, which is applicable to the adapter for the three-dimensional moving image photographing device according to the present invention, and FIG. 4 is an enlarged view of a lens unit according to another preferred embodiment of the present invention, which is applicable to the adapter for the three-dimensional moving image photographing device according to the present invention.

As shown in FIG. 3, the lens unit 20 comprises an entrance lens part 21 and an exit lens part 22. The entrance and exit lens parts 21 and 22 of the lens unit 20 are arranged symmetrically to each other in a straight line so that the moving image passing through the lens unit 20 is not enlarged nor reduced, i.e., it has a magnification of 1:1. In the middle of the lens unit 20 are disposed release lenses 21a and 22a.

The lens unit 20 has the structure in which an entrance pupil point E of the entrance lens part 21 is formed outside the outermost lens of the entrance lens part 21, i.e., outside the lens unit 20 since an imaginary stop is designed while being spaced a prescribed distance (distance from an entrance pupil point E to the outermost lens of the entrance lens part 21) from the outside the outermost lens of the entrance lens part 21. In this embodiment, the entrance pupil point E is located between the total reflecting mirror 53 and the first prism 51 (Refer to FIG. 1).

When the entrance pupil point E is located outside the lens unit 20, the moving image having passed through the lens unit 20 is generally reversed. Since the entrance and exit lens parts 21 and 22 of the lens unit 20 according to the present invention are symmetrical to each other, however, the moving image reversed as it passes through the entrance lens part 21 is reversed again as it passes through the release lenses 21a and 22a, and then passes through the exit lens part 22. Consequently, the non-reversed moving image enters the photographing lens 12.

As shown in FIG. 4, the lens unit 20 comprises an entrance lens part 21' and an exit lens part 22'. The entrance and exit lens parts 21' and 22' run parallel with each other while being spaced apart from each other. Between the entrance and exit lens parts 21' and 22' of the lens unit 20 are disposed Porro-prisms 21a' and 22a' each formed in the shape of a right-angled isosceles triangle instead of the release lenses 21a and 22a as shown in FIG. 3. The Porro-prisms 21a' and 22a' are arranged opposite to each other. The Porro-prisms 21a' and 22a' serve to not only reflect the incident moving image but also reverse the incident moving image. That is to say, the Porro prisms 21a' and 22a' have the same functions as the release lenses 21a and 22a. It can be seen from FIGS. 3 and 4 that the lens unit 20 having the Porro-prisms 21a' and 22a' mounted therein is smaller that the lens unit 20 having the release lenses 21a and 22a mounted therein. Accordingly, it is easily understood that the lens unit 20 as shown in FIG. 4 is very useful when the size of the lens unit must be reduced.

Referring again to FIG. 1, the entrance pupil point E of the lens unit 20 is located outside the photographing lens 12 and in front of the photographing lens 12. Consequently, the distance between the inclined surface of the third prism 52 and the interface 55, which is required to receive both of outermost moving image parts AL2 and AR2 of the right moving image of the object 100 reflected by the second prism 52, is reduced, and thus the size of the third prism 52 is also reduced. Similarly, the distance between the total reflecting mirror 53 and the first prism 51, which is required to receive both of outermost moving image parts AL3 and AR3 of the left moving image of the object 100 reflected by the total reflecting mirror 53, is reduced, and thus the sizes of the total reflecting mirror 53 and the first prism 51 are also reduced. Consequently, it is possible to photograph moving images with wide picture angles, for example picture angles of 52 degrees, without increasing the size of the adapter housing 18.

It is preferable that the distance $d_2$ between the light axis A1 of the photographing lens 12 and the second light axis A2 is equal to the distance $d_1$ between the light axis A1 of the photographing lens 12 and the third light axis A3 to prevent occurrence of any distortion in the resulting moving images comprised of the integrated right and left moving images of the object 100.

Referring again to FIG. 1, over the light axis A1 of the photographing lens 12 and the second light axis A2 is arranged a shutter 60 for alternately passing the right and left moving images of the object 100 having been introduced along the second and third light axes A2 and A3 therethrough. The shutter 60 is disposed between the first prism 51 and the second prism 54 on the light axis A1 of the photographing lens 12. The shutter 60 is also disposed in front of the third prism 52 on the second light axis A2. The shutter 60 is formed with a circular section, a half of which is transparent sufficient to transmit the moving image. The other half of the shutter 60 is opaque not to transmit the moving image. The shutter 60 is connected to an output terminal 16 of a three-dimensional moving image photographing device 10 so that the shutter 60 is rotated at intervals of 1/60 second by means of a signal inputted from the output terminal 16 to the shutter 60 via a controller 32. When the opaque section of the shutter 60 is located on the light axis A1 of the photographing lens 12, and the transparent section of the shutter 60 is located on the second light axis A2, only the right moving image of the object 100 having been introduced along the second light axis A2 enters the photographing lens 12. The right moving image of the object 100 having passed through the photographing lens 12 is recorded on the cassette tape 14 disposed in the three-dimensional moving image photographing device 10. On the other hand, when the transparent section of the shutter 60 is located on the light axis A1 of the photographing lens 12, and the opaque section of the shutter 60 is located on the second light axis A2, only the left moving image of the object 100 having been reflected by the total reflecting mirror 53 and introduced along the light axis A1 of the photographing lens 12 enters the photographing lens 12. The left moving image of the object 100 having passed through the photographing lens 12 is recorded on the cassette tape 14 disposed in the three-dimensional moving image photographing device 10. In this way, the right and left moving images of the object 100 alternately pass through the photographing lens 12 and then recorded on the cassette tape 14 disposed in the three-dimensional moving image photographing device 10.

Embodiment 2

Figure 2:
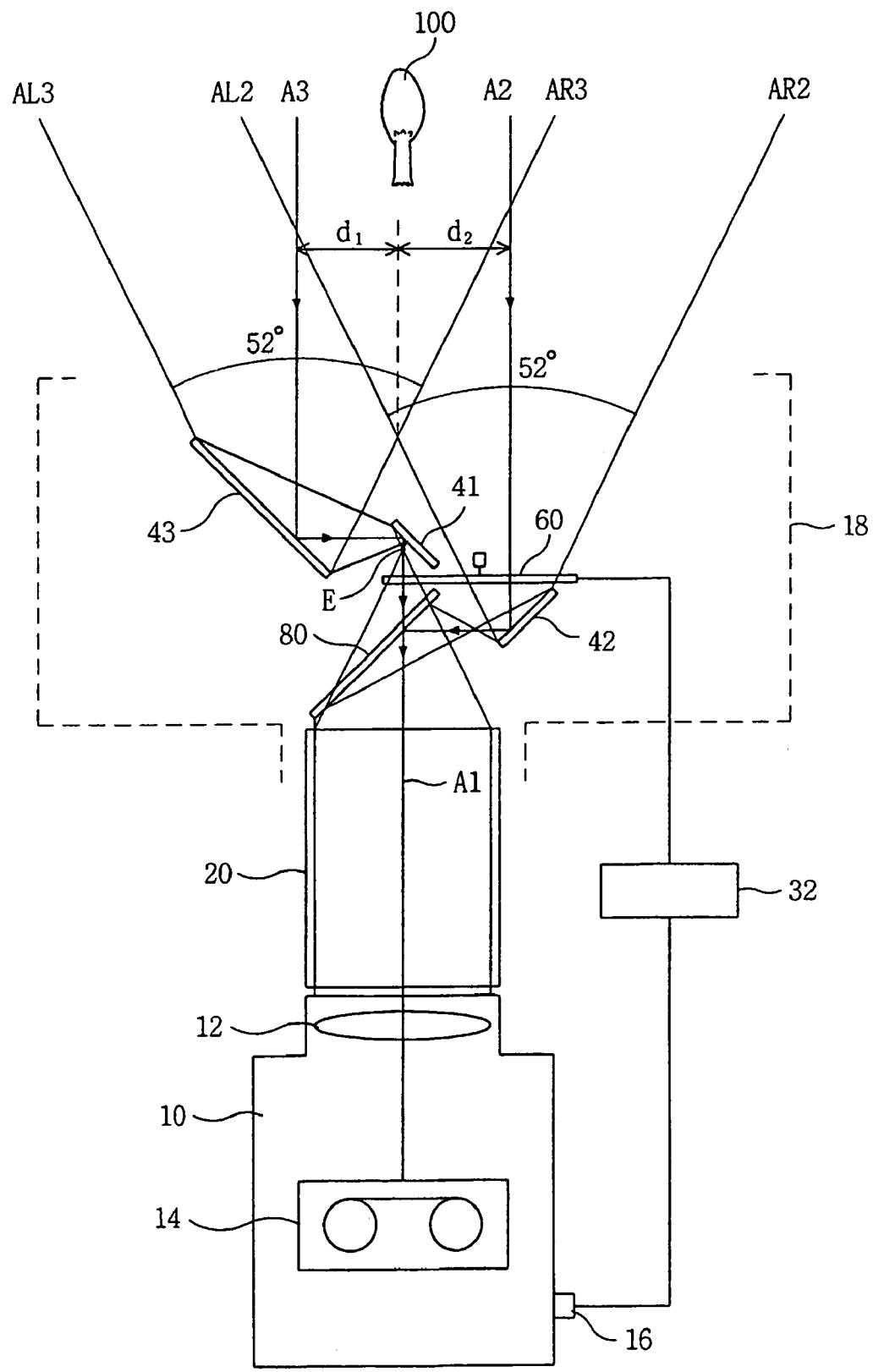
FIG. 2 is a schematic diagram of an adapter for a three-dimensional moving image photographing device according to a second preferred embodiment of the present invention.

FIG. 2 is a schematic diagram of an adapter for a three-dimensional moving image photographing device according to a second preferred embodiment of the present invention. This embodiment is identical in its structure to the previous embodiment except that the adapter housing comprises total reflecting mirrors and a half-reflecting mirror instead of the prisms. Accordingly, only the structure of the adapter housing will be hereinafter described in connection with the adapter for the three-dimensional moving image photographing device according to the second preferred embodiment of the present invention.

In an adapter housing 18 is disposed a half-reflecting mirror 80 on a light axis A1 of a photographing lens 12 in the front of the photographing lens 12, as shown in FIG. 2. The half-reflecting mirror 80 is inclined at an angle of 45 degrees relative to the light axis A1 of the photographing lens 12. The half-reflecting mirror 80 serves to reflect and transmit moving images. On the light axis A1 of the photographing lens 12 is also disposed a fist total reflecting mirror 41. The first total reflecting mirror 41 is spaced a prescribed distance from the half-reflecting mirror 80. The first total reflecting mirror 41 is also inclined at an angle of 45 degrees relative to the light axis A1 of the photographing lens 12 in such a manner that the extensions of the half-reflecting mirror 80 and the first total reflecting mirror 41 are perpendicular to each other.

At prescribed distances from the light axis A1 of the photographing lens 12 are spaced a second light axis A2 and a third light axis A3 in the right and left directions, respectively. On the second light axis A2, along which the right moving image of an object 100 passes, is disposed a second total reflecting mirror 42. The second total reflecting mirror 42 is inclined at an angle of 45 degrees relative to the second light axis A2. On the third light axis A3, along which the left moving image of the object 100 passes, is disposed a third total reflecting minor 43. The third total reflecting mirror 43 is also inclined at an angle of 45 degrees relative to the third light axis A3 in such a manner that the extensions of the second total reflecting mirror 42 and the third total reflecting mirror 43 are perpendicular to each other. The right moving image of the object 100 is reflected by the second total reflecting mirror 42. The reflected right moving image of the object 100 is reflected again by the rear surface of the half-reflecting mirror 80. The reflected right moving image of the object 100 reflected by the rear surface of the half-reflecting mirror 80 passes through a lens unit 20 to enter the photographing lens 12. Consequently, it should be noted that the second total reflecting mirror 42 is arranged so that the right moving image of the object 100 reflected by the second total reflecting mirror 42 is entirely forwarded to the half-reflecting mirror 80.

The left moving image of the object 100 is reflected by the third total reflecting mirror 43. The reflected left moving image of the object 100 is reflected again by the first total reflecting mirror 41. The reflected left moving image of the object 100 reflected by the first total reflecting mirror 41 passes through the half-reflecting mirror 80 and the lens unit 20 to enter the photographing lens 12. Consequently, it should be noted that the third total reflecting mirror 43 is arranged so that the left moving image of the object 100 reflected by the third total reflecting mirror 43 is entirely forwarded to the first total reflecting mirror 41.

Referring again to FIG. 2, over the light axis A1 of the photographing lens 12 and the second light axis A2 is arranged a shutter 60 for alternately passing the right and left moving images of the object 100 having been introduced along the second and third light axes A2 and A3 therethrough. The shutter 60 is disposed between the half-reflecting mirror 80 and the first total reflecting mirror 41 on the light axis A1 of the photographing lens 12. The shutter 60 is also disposed in front of the second total reflecting mirror 42 on the second light axis A2.

As the lens unit 20 of the adapter for the three-dimensional moving image photographing device according to the second preferred embodiment of the present invention, two different kinds of the lens unit 20 previously described in connection with the first preferred embodiment of the present invention may be used. An entrance pupil point E of the lens unit 20 is located between the half-reflecting mirror 80 and the first total reflecting mirror 41 on the light axis A1 of the photographing lens 12. Consequently, the distance between the second total reflecting mirror 42 and the half-reflecting mirror 80, which is required to receive both of outermost moving image parts AL2 and AR2 of the right moving image of the object 100 reflected by the second total reflecting mirror 42, is reduced, and thus the size of the second total reflecting mirror 42 is also reduced. Similarly, the distance between the third total reflecting mirror 43 and the first total reflecting mirror 41, which is required to receive both of outermost moving image parts, AL3 and AR3 of the left moving image of the object 100 reflected by the third total reflecting mirror 43, is reduced, and thus the sizes of the third and first total reflecting mirrors 43 and 4 are also reduced. Consequently, it is possible to photograph moving images with wide picture angles, for example picture angles of 52 degrees, without increasing the size of the adapter housing 18.

INDUSTRIAL APPLICABILITY

As apparent from the above description, the present invention provides an adapter for a three-dimensional moving image photographing device comprising a lens unit interposed between a photographing lens and an adapter housing for alternately passing right and left moving images of an object therethrough, wherein the lens unit has an entrance pupil point formed outside the lens unit, the lens unit has a magnification of 1:1, and the lens unit comprises a plurality of symmetrically arranged lenses for reversing the moving images, whereby it is possible to photograph moving images with wide picture angles without increasing the size of the adapter housing, and to prevent occurrence of any distortion in the resulting moving images comprised of the integrated right and left moving images of the object.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An adapter for a three-dimensional moving image photographing device having a photographing lens and an output terminal, comprising:
a lens unit comprising an entrance lens part and an exit lens part, each of the entrance and exit lens parts including release lenses, the release lenses of the entrance and exit lens parts being disposed in the middle of the lens unit, the entrance and exit lens parts being arranged symmetrically to each other in a line so that a moving image passing through the entrance lens part is reversed at a magnification of 1:1 to leave the exit lens part, the lens unit being disposed in front of the photographing lens and having an entrance pupil point of the entrance lens part formed outside the entrance lens part; and
an adapter housing disposed in front of the lens unit for alternately passing right and left moving images of an object having been introduced along second and third light axes therethrough so that the right and left moving images of the object enters the lens unit along a light axis of the photographing lens, the second and third light axes being spaced at prescribed distances from the light axis of the photographing lens in the right and left directions, respectively.

2. The adapter as set forth in claim 1, wherein the adapter housing comprises:
a first prism having an inclined surface on the light axis of the photographing lens;
a second prism disposed between the first prism and the lens unit for transmitting the moving image reflected by the first prism;
a third prism having an inclined surface on the second light axis for reflecting the moving image having been introduced along the second light axis toward the light axis of the photographing lens; and
a total reflecting mirror disposed on the third light axis for reflecting the moving image having been introduced along the third light axis to the first prism,
wherein the second and third prisms are combined with each other, and the second and third prisms have an interface provided therebetween on the light axis of the photographing lens, the interface being inclined at a prescribed angle to the light axis of the photographing lens and coated with a dielectric substance having a reflectivity of 50% and a transmissivity of 50%.

3. The adapter as set forth in claim 1, wherein the adapter housing comprises:
a first total reflecting mirror disposed on the light axis of the photographing lens, the first total reflecting mirror being inclined at a prescribed angle relative to the light axis of the photographing lens;
a second total reflecting mirror disposed on the second light axis while being inclined at a prescribed angle relative to the second light axis for reflecting the moving image having been introduced along the second light axis toward the light axis of the photographing lens;
a third total reflecting mirror disposed on the third light axis while being inclined at a prescribed angle relative to the third light axis for reflecting the moving image having been introduced along the third light axis toward the light axis of the photographing lens;
and a half-reflecting mirror disposed on the light axis of the photographing lens between the first total reflecting mirror and the lens unit while being inclined at a prescribed angle relative to the light axis of the photographing lens for reflecting the moving image having been introduced along the second light axis and reflected by the second total reflecting mirror, and transmitting the moving image having been introduced along the third light axis and reflected by the third and first total reflecting mirrors.

4. The adapter as set forth in claim 2, further comprising a shutter arranged over the light axis of the photographing lens and the second light axis, the shutter being disposed between the first prism and the second prism on the light axis of the photographing lens and also disposed in front of the third prism on the second light axis, wherein the shutter has a circular section, a half of the circular section being transparent and the other half of the circular section being opaque, for alternately passing the right and left moving images of the object having been introduced along the second and third light axes therethrough.

5. The adapter as set forth in claim 3, further comprising a shutter arranged over the light axis of the photographing lens and the second light axis, the shutter being disposed between the half-reflecting mirror and the first total reflecting mirror on the light axis of the photographing lens and also disposed in front of the second total reflecting mirror on the second light axis, wherein the shutter has a circular section, a half of the circular section being transparent and the other half of the circular section being opaque, for alternately passing the right and left moving images of the object having been introduced along the second and third light axes therethrough.

6. The adapter as set forth in claim 4, wherein the distance between the light axis of the photographing lens and the second light axis is equal to the distance between the light axis of the photographing lens and the third light axis.

7. The adapter as set forth in claim 1, wherein the entrance lens part and exit lens part of the lens unit are parallel with each other while being spaced apart from each other, and each lens part has a PORRO-PRISM, which is formed in the shape of right-angled isosceles triangles and arranged opposite to each other so that the moving image is reversed.

* * * * *